DAVID ARONSON
*INVENTOR.*

DAVID ARONSON
*INVENTOR.*

DAVID ARONSON
INVENTOR.

BY Daniel H. Bobis
Atty

United States Patent Office 3,314,247
Patented Apr. 18, 1967

3,314,247
INTEGRAL PREHEATER AND SUB-COOLING FOR GENERATOR OF ABSORPTION REFRIGERATION SYSTEMS OR EQUIVALENT COMPONENT OF ANOTHER SYSTEM
David Aronson, Upper Montclair, N.J., assignor to Worthington Corporation, Harrison, N.J., a corporation of Delaware
Filed May 31, 1966, Ser. No. 560,038
12 Claims. (Cl. 62—101)

This application is a continuation-in-part of my formerly co-pending, and now abandoned U.S. patent application Ser. No. 447,857 filed Apr. 13, 1965, for "Integral Preheater and Sub-Cooler for the Generator of an Absorption Refrigeration System."

This invention relates to an absorption refrigeration system and like systems in which a condensable vapor is used to heat process liquid. More particularly, the invention relates to an integral preheater and sub-cooler for the generator of an absorption refrigeration system or equivalent component in another system.

The use of low pressure steam as a heat source for heating or boiling the brine and other solution in the generator or equivalent equipment is well known in the art. However its use herefore has required the use of an auxiliary heat exchanger and connecting lines in order to sub-cool the saturated condensed steam so that it would not flash on discharge. In addition when saturated condensate was passed to a vapor trap the liquid would usually be gravity fed to a pump, a cooler or a flash chamber. This type of gravity feed may require the overall elevation of the process equipment, to be increased. For these reasons the resulting system was not only more costly but also less efficient.

It will be understood that the present invention has been embodied in an absorption refrigeration system for illustration only and that those skilled in the art will recognize its wider application to other systems heated by condensable vapors. Though a generator of an absorption refrigeration system is depicted as embodying the present invention it will be understood that any container to which condensable vapor is delivered to heat or boil a process liquid would be equally applicable.

The term process liquid shall include the saline solution of the absorption refrigeration system in addition to any other liquid used in a system in which it is required to be heated or boiled.

Accordingly, it is an object of the present invention to provide a novel integral preheater and sub-cooler for the generator of an absorption refrigeration system which overcomes the prior art disadvantages; which is simple, reliable and economical; which sub-cools the saturated condensed steam to a temperature substantially below the flash point at atmospheric pressure, while preheating the brine solution in the generator; which passes the saturated condensed steam in indirect heat exchange relationship with the brine solution along the greater longitudinal length of the generator for more complete and efficient heat transfer therebetween; which does not require elevating the process equipment.

Another object of this invention is to provide an integral preheater and sub-cooler for the generator of an absorption refrigeration system in which the lower row or rows of tubes will carry the condensate in a flow direction counter current to the direction of flow of the weak solution coming from the heat exchanger and passing through the generator to be concentrated; which provides restrictive means to insure the formation of condensate at a designated point in the generator tube bundle and to substantially prevent the passage of steam downstream of said point; which utilizes the sensible heat of the condensate to preheat the brine solution in the generator; which avoids the use of steam or vapor traps which would otherwise be required; which employs a temperature responsive valve to control the discharge temperature of the sub-cooled condensate; which has predesigned velocity to prevent flashing of the condensate.

Other objects and advantages will be apparent from the following description of several embodiments of the invention and the novel features will be particularly pointed out hereinafter in the claims; reference being had to the accompanying drawings forming a part of this specification wherein like reference characters designate corresponding parts in the several views. Furthermore, the phraseology or terminology employed herein is for purpose of description and not of limitation.

A convenient method used for heating or boiling the process liquid is to employ a condensable vapor as the source of heat. This invention relates to a method and apparatus for sub-cooling the condensate of the heating fluid. The condensable vapor is at a much higher temperature than the process liquid and even after condensing it is still at a higher temperature. This temperature difference is utilized to pass the saturated condensate in a tube or tube bundle in indirect heat exchange relation with the process liquid to sub-cool the condensate to a predetermined temperature so that on discharge from the process container it will not flash. Suitable condensate forming control means such as a temperature responsive valve disposed in the condensate discharge line, or restrictive means disposed in the tube or tube bundle may be used to insure proper predetermined sub-cooling of the condensate. The velocity of the condensate in the tube or tube bundle is kept below that which would cause flashing thereof. In addition a pump may be used to force feed the sub-cooled condensate as required.

Figure 1:
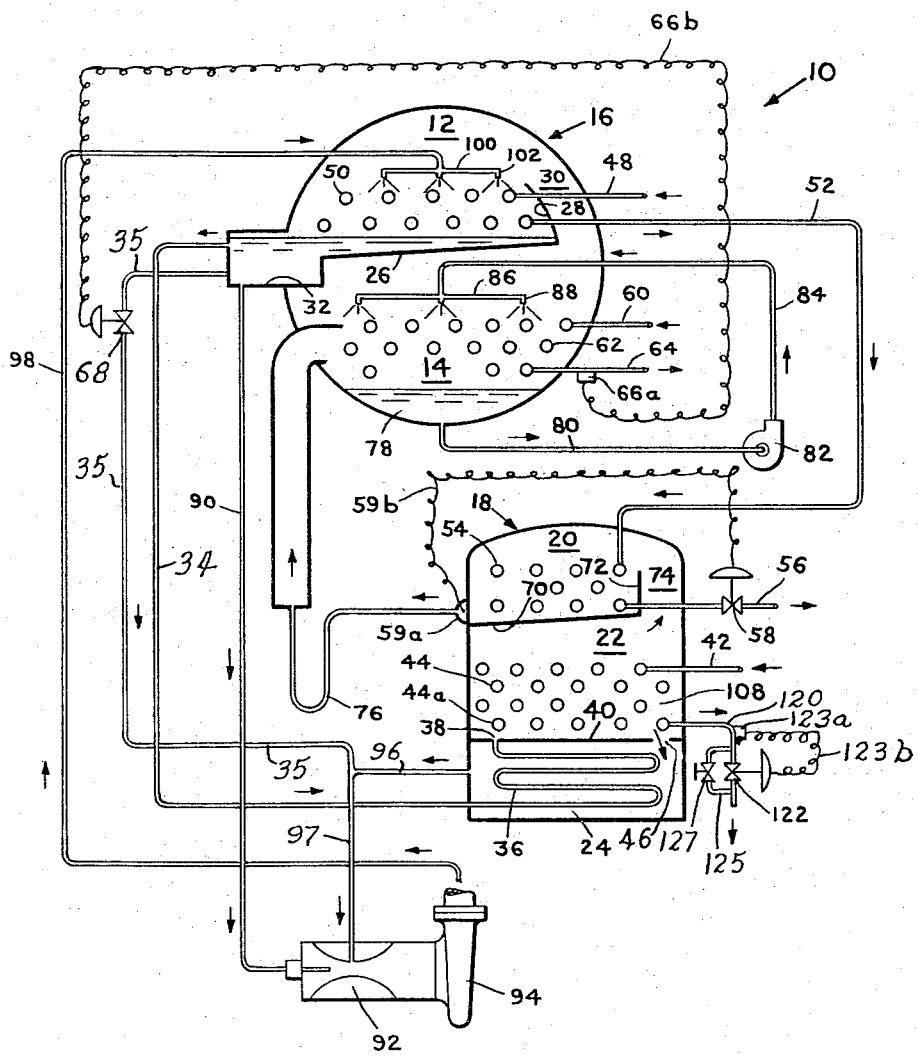
FIGURE 1 is a diagrammatic illustration of an absorption refrigeration system embodying the invention.
Figure 2:
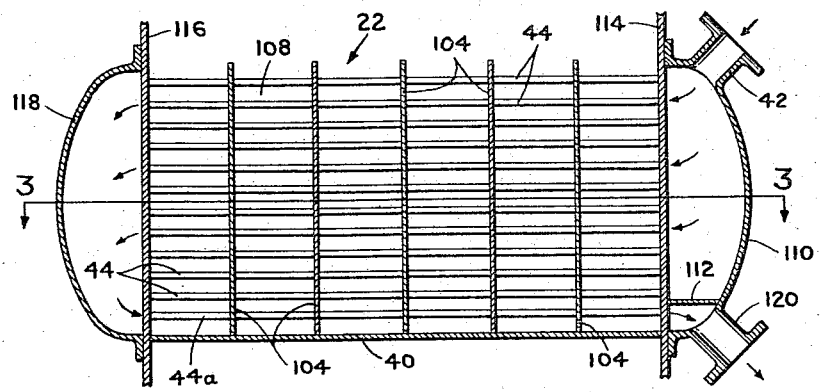
FIGURE 2 is a sectional view taken along line 2—2 of FIGURE 3.
Figure 3:
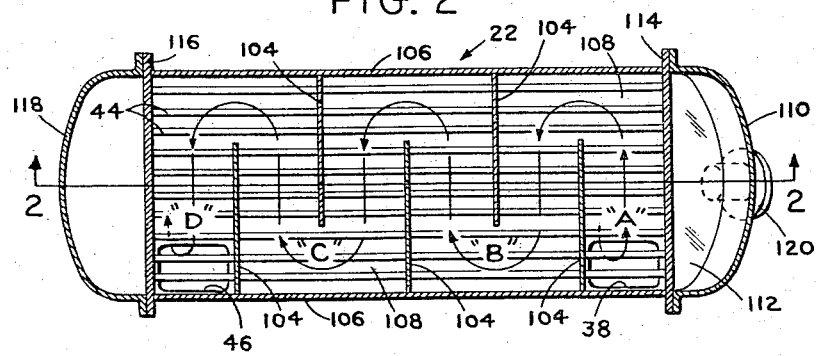
FIGURE 3 is a sectional view taken along line 3—3 of FIGURE 2.

In the embodiment of the invention shown in FIGURES 1, 2 and 3 the novel integral preheater and sub-cooler for the generator is incorporated in an absorption refrigeration system, designated generally as 10.

Absorption refrigeration system 10 is illustrated diagrammatically in FIGURE 1 and contains a brine or saline solution which is circulated therein in varying concentrations. The brine solution is made up of a suitable mixture of an absorbent, such as lithium bromide, and a refrigerant, such as water. The brine solution in the system is referred to as a weak solution whenever it contains a quantity of refrigerant such that the solution is rendered weak in absorbing properties. A weak solution will generally consist of between 55% to 62% lithium bromide. The brine solution in the system is referred to as a strong solution whenever the quantity of refrigerant contained in such solution is deficient so as to enhance the refrigerant absorption properties of said solution. A strong solution will generally consist of between 66% to 69% lithium bromide.

Absorption refrigeration system 10, as shown in FIGURE 1, includes an absorber 12 and an evaporator 14 formed in a low pressure longitudinally extending shell 16. A high pressure longitudinally extending shell 18 is disposed below shell 16 and has formed therein a condenser 20, a generator 22, and a heat exchanger 24.

Shell 16 has a partition 26 extending therethrough to separate absorber 12 from evaporator 14. One end of partition 26 has an upturned edge 28 which defines a passage 30 between the upturned edge 28 and the wall of shell 16. Edge 28 also serves as a spray guard. The other end of partition 26 has a sump 32 formed therein in which the weak solution in absorber 12 may be collected.

A line 34 is connected to deliver weak solution from the upper level of sump 32 to heat exchanger 24. Line 34 connects into coil 36 wherein the weak solution will pass in indirect heat exchange relationship with strong solution leaving generator 22 prior to the weak solution entering the generator 22. Since the pressure of the generator 22 is substantially higher than the pressure in absorber 12, a sufficient head is established in line 34 to permit the gravity flow from absorber 12 to generator 22. The preheated weak solution will enter the generator from coil 36 as shown in FIGURES 1 and 3 through opening 38 on one side of wall 40 which wall separates the generator 22 and the heat exchanger 24.

Line 35 is connected to sump 32 below line 34 with control means 68 disposed therein to regulate the amount of weak solution passing in line 35, which amount will bypass the generator 22. The amount of weak solution passing in line 35 may be termed "spoilage" flow.

Generator 22 includes a longitudinal central passage 108 maintained at a pressure of about 3.0 inches of mercury. In generator 22, refrigerant vapors are boiled from weak brine solution for the purpose of concentrating the latter. Heat is supplied from a suitable source (not shown) to generator 22 through line 42 which connects into tube bundle 44. The heat is derived from low pressure steam at 15 p.s.i.g. and the weak solution will pass in indirect heat exchange relationship with the steam and its condensate, as more fully described hereinafter. The refrigerant vapor driven from the boiling solution will pass upwardly towards the condenser 20. The concentrated hot strong solution will pass out of the generator through opening 46 located on the same side but at the end remote from the solution entrance opening 38, and enters heat exchanger 24.

Absorber 12 has cooling water delivered thereto from a suitable source (not shown) through line 48 which delivers it to tube bundle 50. The cooling water is discharged in line 52 which delivers it to tube bundle 54 disposed within condenser 20. The cooling water is discharged from condenser 20 through line 56. Valve 58 may suitably control the quantity of flow of the cooling water passing through absorber 12 and condenser 20 responsive to the indicated temperature at any other point in system 10, as for example the discharge temperature from condenser 20 as signalled by bulb 59a and capillary 59b.

Liquid to be cooled in evaporator 14 of absorption refrigeration system 10 is introduced by line 60 into the cooling chiller coils or tube bundle 62 in which it is cooled prior to discharge therefrom in line 64. A temperature sensing means such as bulb 66a and capillary 66b may be connected to automatically regulate control valve 68 disposed in line 35, so as to regulate the quantity of weak solution bypassing generator 22 and therefore ultimately control the degree of cooling obtained in evaporator 14. At a time when less than full capacity of generator 22 is required a controlled amount of weak solution from absorber 12 will pass in spoiler line 35, thus bypassing generator 22, and lowering the level of concentration of the brine solution by combining the strong solution from heat exchanger 24 with a predetermined quantity of weak solution from line 35.

Condenser 20 is formed in shell 18 by transverse partition 70 which has one end connected to shell 18 and the other end 72 extending upwardly therefrom to form a passage 74 through which the refrigerant vapor from generator 22 will enter condenser 20. The refrigerant vapor will come in contact with condenser tube bundle 54 and be cooled and condense thereby. The refrigerant condensate will accumulate at the bottom of the condenser and be forced by the existing pressure differential to pass through line loop 76 to evaporator 14, wherein a portion of the condensate will flash and the remainder of the condensate will be collected in reservoir 78 at the bottom of evaporator 14. The refrigerant in reservoir 78 will be drawn off in line 80 by the suction of refrigerant pump 82, which will deliver the refrigerant in line 84 for discharge through spray header 86. The refrigerant is sprayed from nozzles 88 of spray header 86 over cooling chiller coils 62 in which the water is chilled and the refrigerant evaporated on the surface of coil 62, thereby taking heat from the water circulating in coil 62 and chilling it. The refrigerant vapor in evaporator 14 passes through passage 30 into absorber 12.

Sump 32 has a line 90 disposed at the bottom thereof wherein the weak solution will be delivered to flow mixer 92 wherein its flow and the suction of brine solution pump 94 will induce the combined flow of solution in line 97 into flow mixer 92.

The flow in line 97 is a combination of weak solution from line 35 and strong solution from heat exchanger 24 delivered by line 96. Of course, during those periods when the spoilage line 35 is closed by valve 68 the flow in line 97 will be wholly contributed by the strong solution passing in line 96. The now intermediate solution in flow mixer 92 will be discharged from pump 94 into line 98 which is connected to spray header 100. Spray header 100 has a plurality of nozzles 102 from which the intermediate solution is sprayed on to the surface of absorber tube bundle 50 so as to effect a continuous condensation to maintain the absorber interior at an atmosphere of 0.3 inch of mercury.

The vaporized refrigerant entering absorber 12 through passage 30 will be absorbed into the sprayed solution through the absorption process on contact with the solution. Tube bundle 50 serves to cool the solution and remove the heat liberated to the solution when the refrigerant vapor is absorbed. Sufficient refrigerant vapor is absorbed by the sprayed solution so as to collect in sump 32 in the form of weak solution.

Suitable purge means (not shown) may be utilized in the system to remove non-condensibles from the refrigerant.

FIGURES 2 and 3 show the side and top views respectively of the generator 22 the brine solution from heat exchanger 24 will enter generator 22 through opening 38 located at one end adjacent the end wall thereof. Representative figures for the temperature and concentration of the solution are illustrated in FIGURE 3 and may be taken as follows: after the solution enters from opening 38 and at a point designated generally as A the solution will be at a temperature of 170° F. and a concentration of 61%; at point B the solutions temperature will be 190° F. and its concentration 61%; at point C the solution will have a temperature of 210° F. and a concentration of 64%; and just prior to discharge at point D the solution will have a temperature of 215° F. and a concentration of 66%.

A plurality of transverse baffles 104, as shown in FIGURES 2 and 3, alternately extend from opposite longitudinal walls 106 of generator 22 a short distance past the centerline of central flow passage 108. Accordingly as shown in FIGURE 3 the brine solution will be forced to flow around baffles 104 and follow an alternating transverse path through central passage 108 as indicated by the arrows. Thus there are no dead spots and the brine solution will be successfully heated and the concentration increased along the full length of central passage 108.

Steam entering in line 42 will be delivered to header 110 from which the steam passes to the tubes of tube bundle 44 located above partition 112. End walls 114 and 116 serve as tube sheets to which all of the tubes of tube bundle 44 may be suitably connected. Since the tubes of tube bundle 44 extend through baffles 104 no additional supports will be required. As the steam flows from header 110 in tubes 44 into header 118 heat will be given off from the steam so that on the steam reaching header 118 it will be in the form of saturated condensate at temperature of 245° F. The saturated condensate will enter the last row of tubes, designated generally as 44a, and flow in counter current to the brine solution in central passage 108 wherein the saturated condensate will collect in header 110 below partition 112 and be discharged in line 120 from generator 22. Line 120 may have a suitable temperature regulated control valve 122 disposed therein. Valve 122 may act as condensate forming control means as more fully explained hereinafter. The temperature of the condensate entering header 110 is 225° F. having been sub-cooled by 20° F. by passing in indirect heat exchange relationship to the brine solution. The degree of sub-cooling is predetermined by design of the structure or by the optional feature of providing valve 122 responsive to the temperature sensed by a temperature sensing means such as bulb 123a and capillary 123b, which sensing means can be connected to automatically regulate the flow through valve 122. Therefore on discharge, the sub-cooled condensate in line 120 is at a predetermined temperature and may enter the atmosphere without fear of its flashing.

In FIGURE 1 a bypass line 125 having a valve 127 disposed therein to normally prevent flow in bypass line 125 but in the event of malfunctioning of valve 122 valve 127 could be opened to permit bypass flow in line 125 thus having the system operate with quite reasonable effectiveness. The temperature of the discharge condensate would, in most instances, rise above that which obtains with valve 122 in normal operative condition. However, with the arrangement of sub-cooling tubes shown, the performance with the bypass line 125 and valve 127 open would still result in a fair degree of sub-cooling. As an example, on a machine having the steam supplied at a pressure of 12 p.s.i.g., condensing temperature of 244° F., the discharge condensate with control valve 122 set at desired position, was at a temperature of 210° F. With the bypass line 125 and valve 127 open the temperature of the discharge condensate rose to 224° F., which is still 20° below the inlet saturation temperature of the steam. The discharge pressure had fallen to 10 p.s.i.g., which corresponds to a saturation temperature of 240° F. The condensate is thus sub-cooled with reference to its saturated pressure-temperature state by 16° F. The purpose of the design is met in that no steam in the vapor form is lost from the system and a reasonable degree of sub-cooling is achieved in order to improve the overall efficiency and reduce the vapor loss due to flashing on discharge from the machine.

The actual temperature and pressure conditions that will obtain vary considerably with the actual load conditions and with the pattern of the drain piping leading away from the system. The values observed were for a particular load condition and for the particular piping arrangement. At light loads the extent of sub-cooling will be less. As load decreases and reaches the limit of zero load, there will be zero sub-cooling and steam will discharge from the machine as vapor. This is largely hypothetical since in most real situations some amount of heat is lost by radiation of surroundings. Nevertheless the system as disclosed is not completely suited to the case of wide open steam inlet and zero load, unless control valve 122 is operative. Some users might well object to even small losses of steam under conditions of zero load. On the other hand, many users arrange to shut off the steam inlet at periods of zero or extremely small loads, so that this limitation has no relevance.

Figure 4:
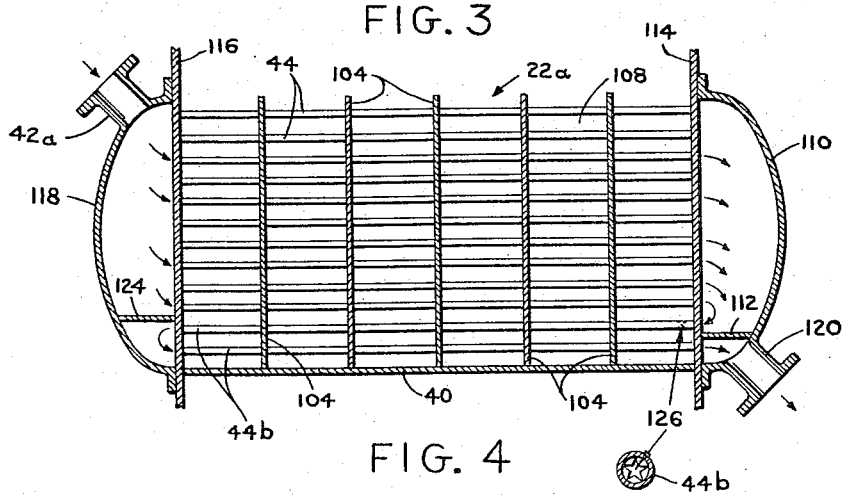
FIGURE 4 is a sectional elevation of the generator in which another form of the invention has been embodied.

In the embodiment of the invention illustrated in FIGURE 4 another form of the invention is depicted. Generator 22a is substantially the same as generator 22 previously described with the exception of having the steam introduced into header 118 instead of header 110, and the addition of a partition 124 preventing the steam from entering the lower two rows of tube bundle 44 this will provide for condensate to make two passes in tubes 44b. Further a suitable restricted device, such as a star insert (not shown) has been disposed in the inside of each of the tubes 44b adjacent to wall 114 and above partition 112. These restrictions are designated generally as 126 and the purpose they serve is to insure the complete condensation of the steam thus preventing the steam from entering tubes 44b at a point downstream of their location. Restrictions 126 may also be termed condensate forming control means. The operation will be substantially the same wherein the steam will enter in line 42a to be distributed in header 118 and pass through the tubes of tube bundle 44 disposed above partition 124 wherein substantially all the steam will be condensed on reaching header 110 however any steam remaining uncondensed will on passing the restriction 126 in the upper row of tubes 44b be condensed so that only condensate will flow in the two rows of tubes 44b wherein the condensate will be suitably sub-cooled and after discharged into header 118 will flow through the lower row of tubes 44b into header 110 and be discharged in line 120 substantially as described hereinbefore.

Figure 5:
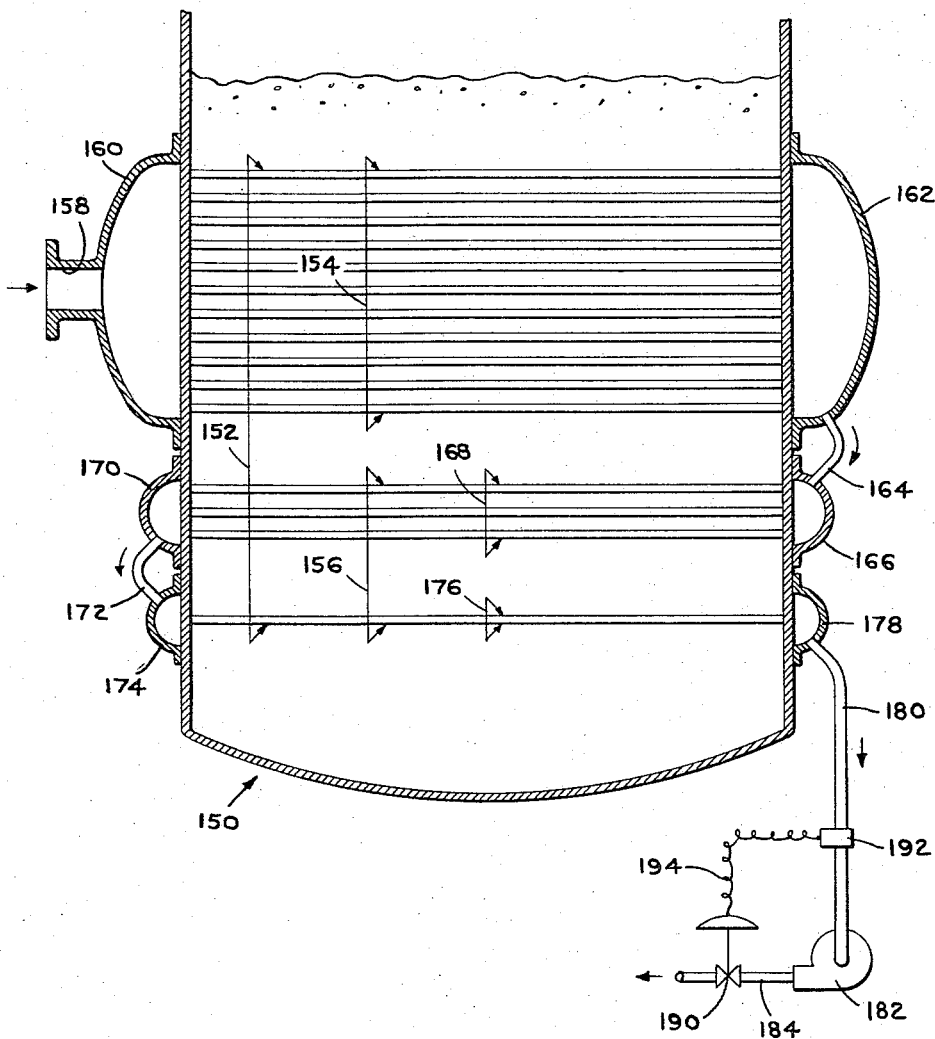
FIGURE 5 is a sectional elevation of a generator or equivalent component capable of use in a system embodying still another form of the present invention.

In the embodiment of the invention illustrated in FIGURE 5 yet another form of the invention is disclosed. A vessel 150 which may be a generator, process evaporator or the like depending upon the particular system in which it operates embodies the present invention. In keeping with the prior description vessel 150 will be considered to be a generator of an absorption system similar to those described hereinbefore. Vessel 150 has a process liquid, such as brine solution, heated and boiled therein after the weak solution entered through an inlet (not shown). The strong solution will be discharged from an outlet (not shown) to be recycled in a system (not shown). The vapor liberated from the boiling process liquid will be likewise recycled in the system.

A tube bundle 152 having a first section 154 and a second section 156 extends across vessel 150 in a plurality of passes. Steam from a suitable source (not shown) is introduced into passage 158 of header 160 from which the steam will be delivered to the first section 154 of tube bundle 152. The process liquid is at an appreciable lower temperature than the steam and is heated or boiled thereby. The steam will give off its heat and be condensed, usually at or near header 162, where it will collect to pass in line 164 into header 166. The condensate in header 166 is at saturation temperature which is still much higher than the heated or boiling temperature of the process liquid. From header 166 the saturated condensate will enter the first pass 168 of the second section 156 and be sub-cooled therein. Though the condensate must have a reasonably high velocity, its velocity cannot be to high or flashing will occur at the entrance of the first pass 168. For steam an initial entrance velocity of 2 ft./sec. is acceptable, and then subsequent passes may be increased to 6 ft./sec.

The sub-cooled condensate leaves first pass 168 and enters header 170 from which it passes in line 172 to enter header 174 for delivery to second pass 176 of second section 156. Second pass 176 will deliver the additionally sub-cooled condensate to discharge header 178 for discharge from vessel 150 in line 180. The condensate may be finally discharged from line 180 or delivered to an optional pump 182 which will discharge into line 184 which acts as a condensate return.

A control valve 190 is normally disposed in line 184 but in the instance that no pump is used then the control valve will be understood to be disposed in line 180, but in either case it will operate responsive to a temperature sensing means such as bulb 192 and capillary 194, which sensing means will automatically regulate the flow through valve 190. As shown in FIGURE 5 the valve 190 will act to throttle the discharge of pump 182 in line 184 so as to maintain the flow proportional and responsive to the temperature of the condensate being pumped. In any event control valve 190 will act as a condensate forming control means.

If sufficient size, surface area and expense were available and utilized the condensate could be cooled down to the temperature of the heated or boiling process liquid. As a practical matter, cooling down to within a degree or a few degrees of the temperature of the boiling liquid is sufficient to provide the desired beneficial conditions which permit easy removal of the condensate. Thus the second section or condensate cooler 156 need remove only a small fraction of the heat given up by the condensing vapor in the first section 154, so that even though it cools the condensate down to a small temperature difference between condensate and heated or boiling process liquid, the size of the heat exchanger is usually within acceptable limits as regards size, surface area and cost.

Outflow of the sub-cooled condensate is then controlled by a temperature responsive valve 190 set to the desired sub-cooled temperature, as established by the initial design of the sub-cooling section. In this way, the system will automatically discriminate between liquid and vapor and will serve to operate so that only sub-cooled liquid is allowed to pass valve 190.

In those systems where the condensable vapor heating fluid is supplied at a substantially constant pressure i.e. such as steam below 15 p.s.i.g., the usual inlet control valve for the steam may be omitted. The inlet control valve would act to vary the rate of admission of steam in accordance with the process load. If the process loads vary rapidly then the inlet control valve would still be required. However, where variations take place at a moderate rate, the novel condensate control system disclosed will serve to regulate heat input essentially proportional to load. Since the condensate control valve 190 is only a small fraction of the size of a steam valve it makes for a cheaper installation, operating in this fashion and alleviates the need for vapor traps at the discharge of the condensate.

While the condensation of the steam will usually occur near header 162 the actual location will fluctuate dependent upon the load of the system. At the point of condensation a liquid vapor interface will exist. Since the process loads of the system will vary the location of the liquid-vapor interface will also vary. The condensate control valve 190 functions to hold a particular discharge temperature of the condensate. At high loads the temperature difference between steam and heated or boiling liquid will be greater than at light loads. This, in turn makes the sub-cooler more effective and sub-cooling is completed in a smaller length of flow of condensate than is required at light loads, when the boiling liquid tends to approach the temperature of the steam condensing. The condensate temperature control valve 190 starts to close down, causing condensate to back up into the condensing section, so reducing its effectiveness until an equilibrium is established. Thus at light loads the liquid-vapor interface may be located upstream of header 162 in the tubes of the first section, while at heavy loads the liquid-vapor interface will be located downstream of header 162 in the tubes of the second section.

The overall system operates then without flashing of condensate and without having to handle the tricky problem of distinguishing between vapor and liquid.

In summary, the system disclosed thus gives simple, reliable control and sub-cooling of condensate, avoidance of flashing of condensate, and under many conditions of service, control of steam input.

It will be understood that various changes in the details, materials, arrangements of parts and operating conditions which have been herein described and illustrated in order to explain the nature of the invention may be made by those skilled in the art within the principles and scope of the invention as expressed in the claims.

What is claimed is:

1. A heat exchanger comprising:
    an elongated casing having an inlet at one end and an outlet at the other end;
    means for supplying a fluid to be heated to the inlet of the casing;
    a tube bundle in the casing, the tube bundle having a first and second section, the outlet of the first section communicating with the inlet of the second section;
    means for supplying a vaporous heating fluid to the inlet of the first section for passage through the tubes in an indirect heat exchange relation to the solution in the casing;
    a flow restricter downstream of the outlet of the first tube section for causing the formation of a vapor-liquid interface in the heating fluid flow path upstream of the second tube section outlet; and
    whereby condensate in the second tube section will pass in heat exchange relation with the solution to sub-cool the condensate and will effectively prevent any vapor from reaching the tube outlet.

2. The heat exchanger as defined in claim 1 wherein the flow restricter is a metering valve responsive to the discharge temperature of the sub-cooled condensate to control the condensate flow and thereby maintain the discharge temperature at a predetermined value.

3. A method of condensing and sub-cooling a vaporous heating fluid used to heat a process liquid in a container comprising the steps of:
    passing the vaporous heating fluid through a plurality of tubes in indirect heat exchange relation with the process liquid to heat the process liquid and condense the heating fluid;
    sub-cooling the condensate of the heating fluid by passing the condensate through a second set of tubes in indirect heat exchange relation with the process liquid; and
    controlling the flow of condensate in response to condensate discharge temperature so as to maintain the interface formed between the vapor and the condensate upstream of the outlet of the second set of tubes at all times.

4. The method claimed in claim 3 wherein:
    (a) the velocity at vapor-liquid interface of the heating fluid to be established at a predetermined value, low enough to prevent flashing of the condensate in the tubes.

5. A generator for absorption refrigeration system having the generator, a condenser, an evaporator and an absorber in which weak solution is passed from the absorber to the generator and strong solution is passed from the generator to the absorber, each in selective concentrations, the generator comprising:
    (a) an elongated casing having an inlet adjacent one end and an outlet adjacent the other end thereof, into which the weak solution is introduced and the strong solution is discharged, respectively,
    (b) a tube bundle means having a first portion and a second portion disposed in the casing in communication with a steam source,
    (c) the first portion of the tube bundle means to pass the steam in heat exchange relation with the solution in the generator whereby saturated condensate is formed at the vapor-liquid interface defining the boundary of the first section,
    (d) the second section of the tube bundle means extending from the vapor-liquid interface to pass saturated condensate in heat exchange relation with the solution in the generator to sub-cool the condensate, prior to the discharge thereof, and (e) condensate forming control means in communication with the tube bundle means to maintain the formation of condensate at the vapor-liquid interface of the heating fluid.

6. The combination claimed in claim 5 wherein:
(a) the condensate forming control means including restrictive means disposed in the tube bundle means to define the vapor-liquid interface by preventing the passage of steam therethrough.

7. The combination claimed in claim 5 wherein:
(a) the condensate forming control means including a valve means operative responsive the discharge temperature of the sub-cooled condensate to maintain the discharge temperature at a predetermined value.

8. The combination claimed in claim 7 wherein:
(a) a pump having its suction in communication with the second section of the tube bundle means to receive the discharged sub-cooled condensate from the container, and
(b) the valve means disposed to throttle the flow at the discharge of the pump responsive to the discharge temperature of the sub-cooled condensate.

9. The combination claimed in claim 8 wherein:
(a) a temperature sensing means connected to operate the valve means, and
(b) the temperature sensing means disposed upstream of the pump to signal the temperature of the discharged sub-cooled condensate before it enters the pump whereby the valve means will open or close responsive to said signal in order to maintain the flow proportional and within the predetermined range of temperature.

10. The combination claimed in claim 8 wherein:
(a) the first section of the tube bundle disposed in superposition to the second section of the tube bundle, and
(b) at least a portion of the condensate in the second section to pass in counterflow heat exchange relation with the solution in the generator.

11. The combination claimed in claim 10 wherein:
(a) the second section of the tube bundle means to make a plurality of passes in heat exchange relation with the solution in the generator whereby the condensate will be sub-cooled below the flash point thereof at atmospheric pressure, prior to the discharge from the generator.

12. The combination claimed in claim 7 wherein:
(a) a bypass means disposed about the temperature responsive valve means in a normally closed position and adapted to be opened to bypass the flow of sub-cooled condensate being discharged, and
(b) the second section of the tube bundle of a predetermined length and diameter to permit at least a 15° F. sub-cooling of the condensate passing therein.

References Cited by the Examiner
UNITED STATES PATENTS

| | | | |
|---|---|---|---|
| 2,004,390 | 6/1935 | Benzinger | 165—110 |
| 2,753,954 | 7/1956 | Tinker | 165—158 |
| 3,181,606 | 5/1965 | Belanger | 165—158 |
| 3,182,720 | 5/1965 | Brown | 165—158 |
| 3,195,318 | 7/1965 | Miner | 62—148 |

LLOYD L. KING, *Primary Examiner.*